United States Patent
Panahpour Tehrani et al.

(10) Patent No.: US 8,548,227 B2
(45) Date of Patent: Oct. 1, 2013

(54) IMAGE PROCESSING APPARATUS AND COMPUTER PROGRAM

(75) Inventors: Mehrdad Panahpour Tehrani, Saitama (JP); Akio Ishikawa, Saitama (JP)

(73) Assignee: KDDI Corporation, Tokyo (JP)

( * ) Notice: Subject to any disclaimer, the term of this patent is extended or adjusted under 35 U.S.C. 154(b) by 393 days.

(21) Appl. No.: 12/718,710

(22) Filed: Mar. 5, 2010

(65) Prior Publication Data
US 2010/0254627 A1    Oct. 7, 2010

(30) Foreign Application Priority Data
Apr. 3, 2009    (JP) .................................. 2009-090659

(51) Int. Cl.
*G06K 9/00*    (2006.01)
(52) U.S. Cl.
USPC ........... 382/154; 382/199; 382/276; 382/281; 382/293; 382/302; 382/205; 345/426; 345/582; 345/589
(58) Field of Classification Search
CPC ............................... G06T 15/00; G06T 7/0022
USPC ................ 382/154, 199, 276, 281, 293, 302, 382/205; 345/426, 582, 589
See application file for complete search history.

(56) References Cited

U.S. PATENT DOCUMENTS

| 6,417,841 B1 | 7/2002 | Doi et al. | |
| 2009/0041336 A1* | 2/2009 | Ku et al. | 382/154 |
| 2010/0194862 A1* | 8/2010 | Givon | 348/49 |

FOREIGN PATENT DOCUMENTS

| JP | 10-141913 | 5/1998 |
| JP | A-2000-3445 | 1/2000 |
| JP | A-2001-67473 | 3/2001 |
| JP | A-2002-208073 | 7/2002 |
| JP | A-2008-015756 | 1/2008 |

OTHER PUBLICATIONS

Naemura et al., "Ray-Based Creation of Photo-Realistic Virtual World," *VSMN*, pp. 59-68, 1997.
Droese et al., "Ray-Space Interpolation based on Filtering in Disparity Domain," *Proc. of 3D Image Conference 2004*, pp. 1-4, 2004.
Dec. 4, 2012 Office Action issued in Japanese Patent Application No. 2009-090659 (with English translation).

* cited by examiner

*Primary Examiner* — Mike Rahmjoo
(74) *Attorney, Agent, or Firm* — Oliff & Berridge, PLC

(57) ABSTRACT

The present invention relates to an image processing apparatus for compressing image data used in an image generating apparatus for generating a free-viewpoint image. According to the invention, the apparatus has a selecting unit that selects one image as a first image, and defines other images as second images, a projective transformation unit that generates a projected depth map of a second image from a depth map of the first image, a subtracting unit that creates a difference map of the second image, and a storage unit that stores the depth map of the first image and the difference map of the second image. Here, the difference map is a difference between a depth map of the second image and the projected depth map of the second image, and the depth map indicates a depth value of each pixel of a corresponding image.

4 Claims, 10 Drawing Sheets

IMAGE PROCESSING APPARATUS AND COMPUTER PROGRAM

PRIORITY CLAIM

This application claims priority from Japanese patent application No. 2009-90659 filed on Apr. 3, 2009, which is incorporated herein by reference.

BACKGROUND OF THE INVENTION

1. Field of the Invention

The present invention relates to a free viewpoint video system.

2. Description of the Related Art

Various proposals has been made for generating a free viewpoint video from motion pictures captured by several cameras, for example, in Japanese patent publication 2008-15756A1, "Ray-Based Creation of Photo-Realistic Virtual World" by Takeshi Naemura, et al. (VSMM97, pp. 59-68) and "Ray-Space Interpolation based on Filtering in Disparity Domain" by Michael Droese, et al. (Proc. of 3D Image Conference 2004)

The method proposed in above documents is called image based rendering. More specifically, a ray-space is generated using a plurality of images captured by a plurality of cameras, and an image from an arbitrary viewpoint is generated by interpolation using each ray value in the ray-space.

SUMMARY OF THE INVENTION

In a free viewpoint video system, in response to input an arbitrary viewpoint from a user terminal such as a personal computer, a video signal from the viewpoint is generated and displayed on the user terminal. To realize such a free viewpoint video system, it is required to shorten the image generating time. If images of almost all viewpoints could be generated and stored in an image generating apparatus beforehand, the image generating time could be shortened enough. However, it is not realistic. Thus, to realize the free viewpoint video system, data that are generated and stored in an image generating apparatus should have a realistic size. Further, data generated in advance must enable the image generating apparatus to generate a Image from an arbitrary viewpoint as quick as possible.

The invention has been made in view of the above-mentioned problem, and it is therefore an object of the present invention to provide an image processing apparatus that generates data for an image generating apparatus. The data generated by the image processing apparatus make it possible to generate an image from an arbitrary viewpoint quickly, but the amount of data is small enough to store a storage unit, which is currently available. Further, it is also an object of the present invention to provide a computer program, which functions a computer as the image processing apparatus.

According to the invention, the image processing apparatus includes a selecting unit, a projective transformation unit, a subtracting unit and a storage unit. The selecting unit is configured to select one image as a first image from images, and is configured to define the other images as second images. The projective transformation unit is configured to generate a projected depth map of a second image from a depth map of the first image. Here, the depth map indicates a depth value of each pixel of a corresponding image. The subtracting unit is configured to create a difference map of the second image. The difference map is a difference between a depth map of the second image and the projected depth map of the second image. The storage unit is configured to store the depth map of the first image and the difference map of the second image.

Preferably, the apparatus further includes a first filter unit, which is configured to filter the difference map of the second image.

Advantageously, the apparatus further includes an adding unit, which is configured to generate a decompressed depth map of the second image by adding the projected depth map and the difference map of the second image.

Preferably, the apparatus further includes a second filter unit, which is configured to detect edge areas of the difference map of the second image, and configured to filter areas of the decompressed depth map corresponding to the detected edge areas.

According to the invention, a computer program functions a computer as the image processing apparatus, and a computer readable medium includes the computer program.

The difference between the projected depth map and the depth map of the second image is small, and an amount of data to be stored in the storage unit can be reduced.

Further objects and advantages of the present invention will be apparent from the following description of the preferred embodiments of the invention as illustrated in the accompanying drawings.

DETAILED DESCRIPTION OF THE INVENTION

A viewpoint is specified by a position and a direction, and "an image of a viewpoint" or "an image from a viewpoint" means an image within the predetermined visual field at the position and the direction specified by the viewpoint in the following description. Further, camera parameters of a camera can be considered as a viewpoint and a visual field, and an image captured by a camera is also referred to as an image of a viewpoint. In this case, a position of the viewpoint is a position of the camera, and a direction of the viewpoint is a direction of the camera.

Figure 1:
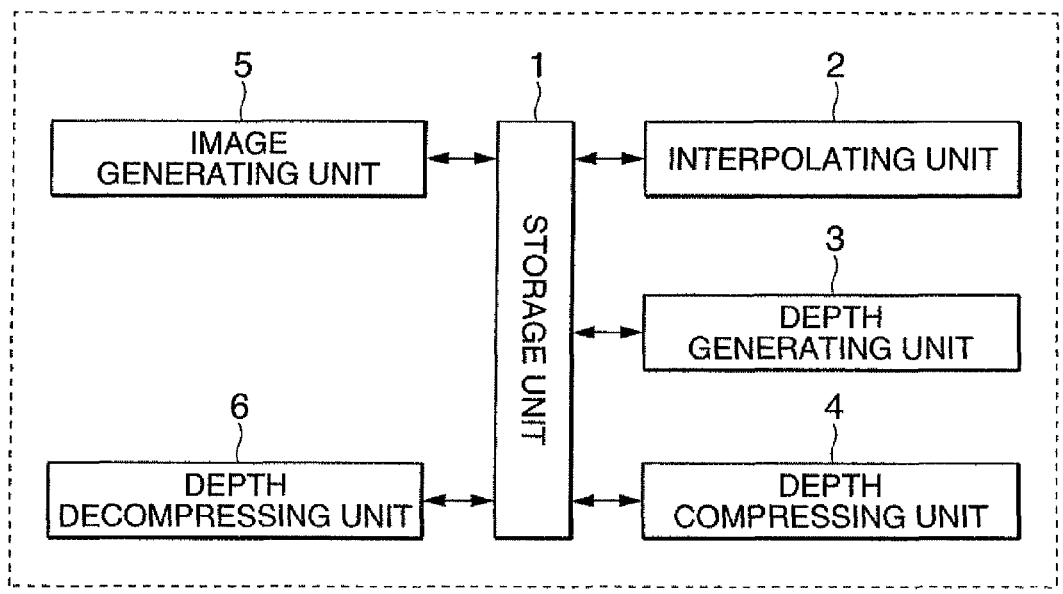
FIG. 1 shows a block diagram of an image processing apparatus according to the invention.

FIG. 1 shows a block diagram of an image processing apparatus according to the invention. As shown in FIG. 1, the image processing apparatus has a storage unit 1, an interpolating unit 2, a depth generating unit 3, a depth compressing unit 4, an image generating unit 5 and a depth decompressing unit 6.

The interpolating unit 2 generates a plurality of new images of predetermined viewpoints from images in motion pictures captured by a plurality of cameras. The interpolating unit 2 uses interpolation technique based on camera parameters of the cameras to generate new images. Hereinafter, the term "captured Image" refers to an image captured by a camera, the term "interpolated image" refers to an image generated at the interpolating unit 2 from captured images and/or interpolated images. Further, both "captured image" and "interpolated image" are referred to collectively as "pre-image." The interpolating unit 2 stores captured images and interpolated images to the storage unit 1.

Figure 3:
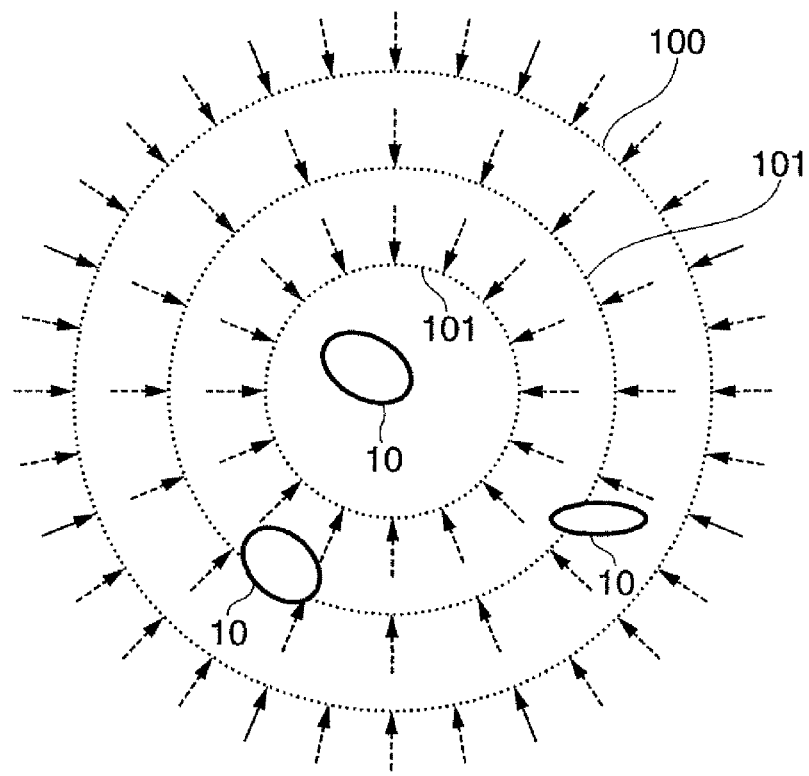
FIGS. 3 and 4 show viewpoints of pre-images.
Figure 4:
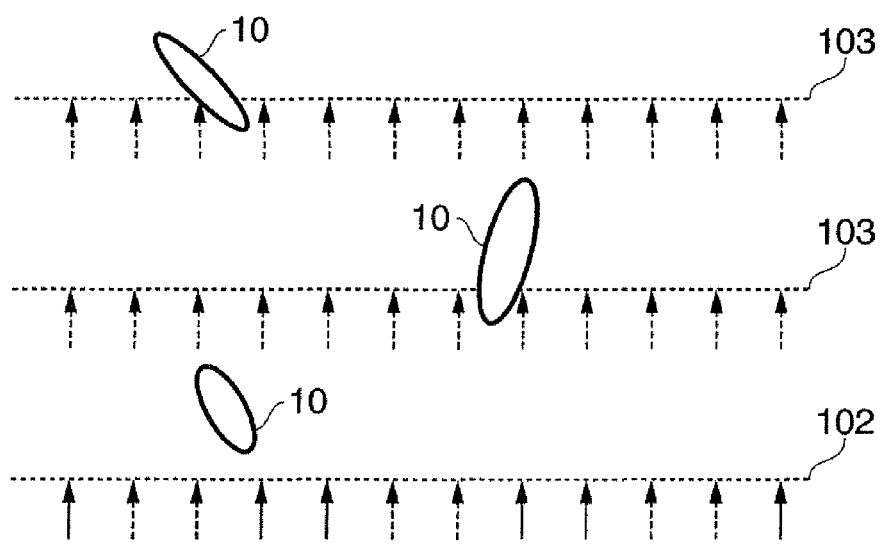

FIGS. 3 and 4 show viewpoints of pre-images. In FIGS. 3 and 4, a reference numeral 10 denotes an object, a solid arrow denotes a viewpoint of a captured image, and a dotted arrow denotes a viewpoint of an interpolated image. A direction of the arrow indicates a direction of the viewpoint. FIG. 3 shows cameras are arranged on a circle line 100 such that they surround objects 10 to capture captured images. In this case, viewpoints for interpolated images generated by the interpolating unit 2 are placed between viewpoints of captured images on the same circle line 100. Further, other viewpoints for interpolated images are placed on circle lines 101, which are concentric with the circle line 100 and have smaller radius than the circle line 100. All viewpoints are directed towards the center of the circle lines 100 and 101 as shown in FIG. 3.

FIG. 4 shows cameras are arranged on a straight line 102. In this case, viewpoints of interpolated images generated by the interpolating unit 2 are placed between viewpoints of captured images on the straight line 102. Further, other viewpoints are placed on straight lines 103, which are parallel to the straight line 102 and located on an object side with reference to the straight line 102. As shown in FIG. 4, directions of all viewpoints are the same. The number of viewpoints for interpolated image is decided by a capacity available for the storage unit 1.

As shown in FIGS. 3 and 4, a plurality of viewpoints are set beforehand on curbed lines and/or straight lines in an area, where objects 10 are placed, and the interpolating unit 2 generates interpolated images at the viewpoints. Hereinafter, the straight line or the curbed line, which has viewpoints, is referred to as "layer."

Figure 5:
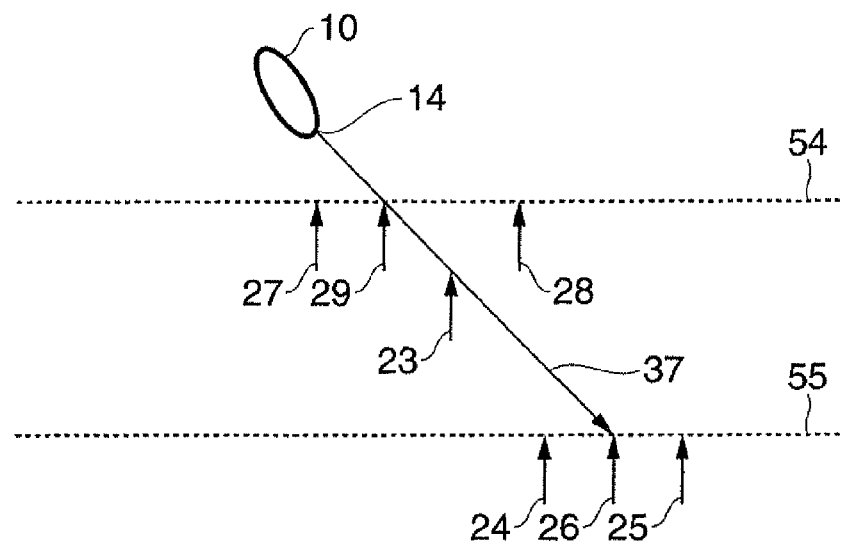
FIGS. 5 and 6 are explanation drawings of a process at an interpolating unit.

If a viewpoint of an interpolated image to be generated is located on the same layer as ones of captured images, the interpolated image can be generated from captured images using a weighting factor corresponding to a distance of viewpoints. It is preferable to use captured images close to the interpolated image to be generated, for example captured images on both sides of the interpolated image. If a viewpoint of an interpolated image to be generated is on a different layer from ones of captured images, the interpolating unit 2 determines a ray passing through the interpolated image, searches a pixel caused or generated by the ray on a pre-image, and determines a pixel value of the interpolated image based on the searched pixel. For example, in FIG. 5, reference numerals 54 and 55 denote layers, reference numerals 24 to 29 denote pre-images, a reference numeral 14 denotes a point on the object 10, a reference numeral 23 denotes an interpolated image to be generated, and a reference numeral 37 denotes a ray from the point 14 passing through the interpolated image 23. Since the ray 37 also passes through pre-images 26 and 29, pre-images 26 and 29 have a pixel caused by the ray 37. Thus, the interpolating unit 2 can determine a pixel value of a pixel, which represents the point 14 on the interpolated image 23, from a pixel caused by the ray 37 in the pre-image 26 or 29. The interpolating unit 2 can find pre-images 26 and 29 by searching cross points of the ray 37 and each layer. If there is no pre-image at any cross point of the ray 37 and each layer, the interpolating unit 2 determines a pixel value caused by the ray 37 from pre-images close to a cross point with the ray 37. For example, the interpolating unit 2 determines the pixel value caused by the ray 37 from the pre-image 24 and/or 25, if there are no pre-images 26 and 29.

Figure 6:
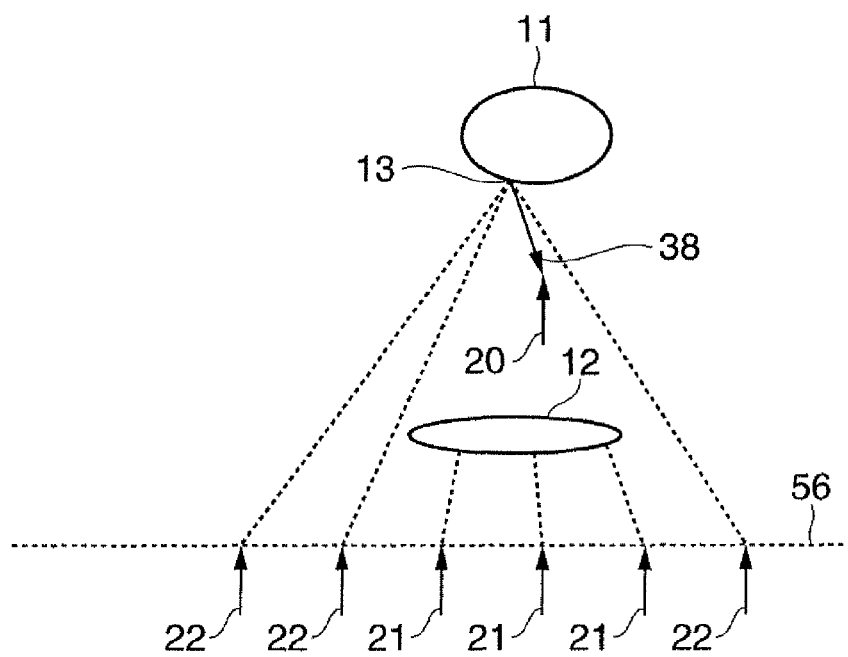

However, a pre-image at a cross point of a ray and a layer does not always have a pixel caused by the ray. In FIG. 6, a reference numeral 56 denotes a layer, reference numerals 11 and 12 denote objects, a reference numeral 13 denotes a point on the object 11, reference numerals 21 and 22 denote pre-images, a reference numeral 20 denotes an interpolated image to be generated, and a reference numeral 38 denotes a ray from the point 13 passing through the interpolated image 20. In this case, the ray 38 is blocked by the object 12. Therefore, a pre-image at the cross point of the ray 38 and the layer 56 has no pixel caused by the ray 38. Further, pre-images 21 have no information about a color of the point 13 due to the object 12. In this case, the interpolating unit 2 need to search pre-images having information about a color of the point 13 for generating the interpolated image 20. To search pre-images having information about a color of the point 13 such as pre-images 22, the interpolating unit 2 uses depth value in a depth map generated by the depth generating unit 3.

The depth map is generated for each pre-image by the depth generating unit 3, and it indicates a distance between the viewpoint and a point on an object represented by each pixel. Thus, if there are n pixels in a pre-image, a depth map of the pre-image has n depth values. The depth generating unit 3 generates depth maps using a well-known art like a stereo matching method, and stores them into the storage unit 1.

The depth compressing unit 4 compresses depth maps generated by the depth generating unit 3, and stores compressed data into the storage unit 1. The depth decompressing unit 6 decompresses compressed data in the storage unit 1, and outputs decompressed depth maps. The detail of the depth compressing unit 4 and the depth decompressing unit 6 is explained later, and an image generation at the image generating unit 5 is explained next.

Figure 7A:
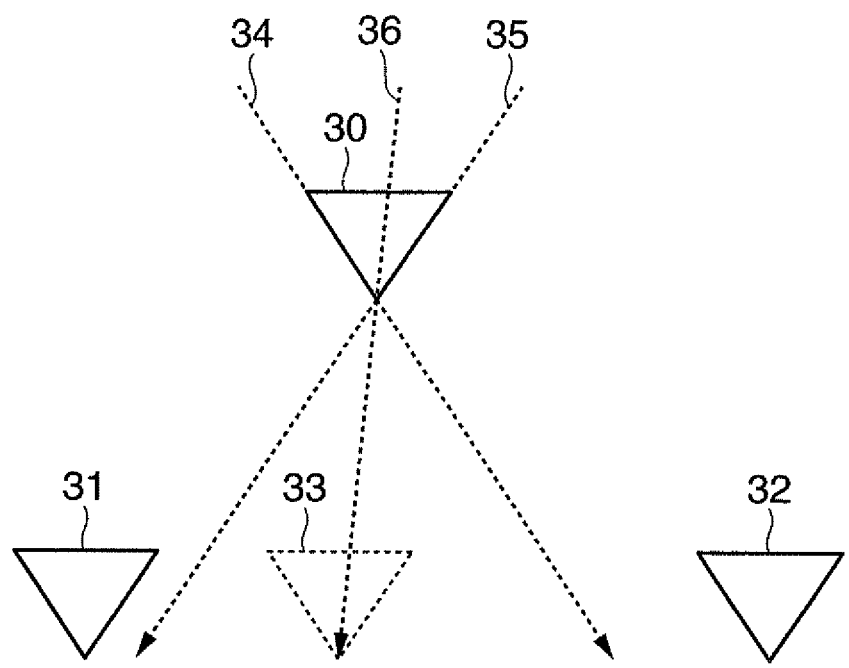
FIGS. 7A, 7B and 8 are explanation drawings of an process at an image generating unit.
Figure 7B:
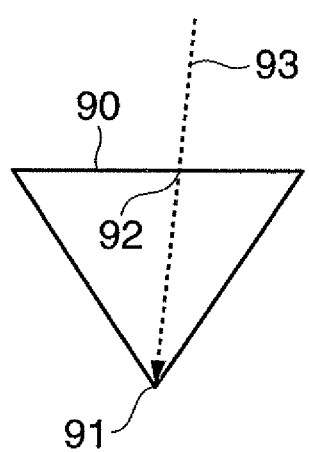

FIG. 7A shows a basic process of the image generation from a specified viewpoint performed by the image generating unit 5, and FIG. 7B shows an image representation method used in FIG. 7A. In FIG. 7B, a reference numeral 90 is a plane, not a line. That is, each image is expressed as a square pyramid. In this representation, the plane 90 corresponds to an image plane having a plurality of pixels, a point 91 corresponds to a viewpoint, and a direction of a normal line from the point 91 to the plane 90 corresponds to a direction of the viewpoint. In this case, a pixel value of a pixel 92 on the plane 90 is decided by a ray 93, which passes through the pixel 92 and reaches the point 91.

In FIG. 7A, a reference numeral 30 denotes an image to be generated, and reference numerals 31 and 32 denote pre-images on the closest layer to a viewpoint of the image 30. The image generating unit 5 generates the image 30 by deciding pixel values caused or generated by rays, which passes through the viewpoint of the image 30 and located between rays 34 and 35. For determining a pixel value caused by a ray 36, the viewpoint determination unit 61 searches a cross point of the ray 36 and the closest layer. In case of FIG. 7A, a viewpoint at an image 33 is searched. The image generating unit 5 uses pre-images that are on the closest layer and located on both sides of the cross point to decide a pixel value by the ray 36. In case of FIG. 7A, the image generating unit 5 uses pre-images 31 and 32. To decide the pixel value by the ray 36, the image generating unit 5 generates a depth map of the image 33 from a depth map of the pre-image 31 by projective transformation, and determines a depth value of a pixel caused by the ray 36 on the image 33 based on the generated depth map of the image 33. In other word, the projective transformation unit 62 determines the depth value of the pixel cause by the ray 36 on the image 33 based on the viewpoint, visual field and depth values of the pre-image 31 and the viewpoint and visual field of the image 33.

Then, the image generating unit 5 searches corresponding pixels on pre-images 31 and 32, which represent the same point as the pixel caused by the ray 36, based on depth maps of pre-images 31 and 32 as well as a depth value of the pixel caused by the ray 36 on the image 33. More specifically, since the depth value of the pixel caused by the ray 36 on the image 33 indicates an originating point of the ray 36, the image generating unit 5 finds a pixel representing the originating point on pre-images 31 and 32 based on their depth maps. Finally, the image generating unit 5 calculates the pixel value caused by the ray 36 based on pixel values of corresponding pixels on pre-images 31 and 32. In this calculation, a distance between the image 33 and pre-images 31 and 32 are considered. For example, the pixel value caused by the ray 36 is $A*X+(1-A)*Y$, where X is a pixel value of the corresponding pixel on the pre-image 31, Y is a pixel value of the corresponding pixel on the pre-image 32, and A is a ratio of a distance between the pre-image 31 and the image 33 to a distance between the pre-images 31 and 32.

In the above embodiment, pre-images 31 and 32 are used to determine the pixel value caused by the ray 36. However, it is possible to determine the pixel value caused by the ray 36 using the pre-image 31 only. Off course, it is possible to determine the pixel value caused by the ray 36 using the pre-image 32 only.

As described above, pixel values of the image 30 are determined by pre-images on the closest layer and depth maps corresponding to the pre-images. However, pre-images 31 and 32 may not have a corresponding pixel to the pixel caused by the ray 36 due to occlusion. If the pre-image 31 has no corresponding pixel to the pixel caused by the ray 36, it is not possible to obtain a depth value for the pixel caused by the ray 36 on the image 33. In this case, it is not possible to determine a pixel value caused by the ray 36 from the pre-image 31.

More specifically, to determine a pixel value caused by the ray 36 based on pre-images 31 and 32, the depth value of the pixel caused by the ray 36 on the image 33 must be obtained from depth maps of the pre-images 31 and 32. To determine a pixel value caused by the ray 36 based on the pre-image 31, the depth value of the pixel caused by the ray 36 on the image 33 must be obtained from the depth map of the pre-image 31. If the depth value of a pixel caused by the ray 36 cannot be obtained from depth maps of the pre-image 31 and/or 32 on the closest layer, the image generating unit 5 determines the pixel value by the ray 36 using pre-images and their depth maps on other layers.

Figure 8:
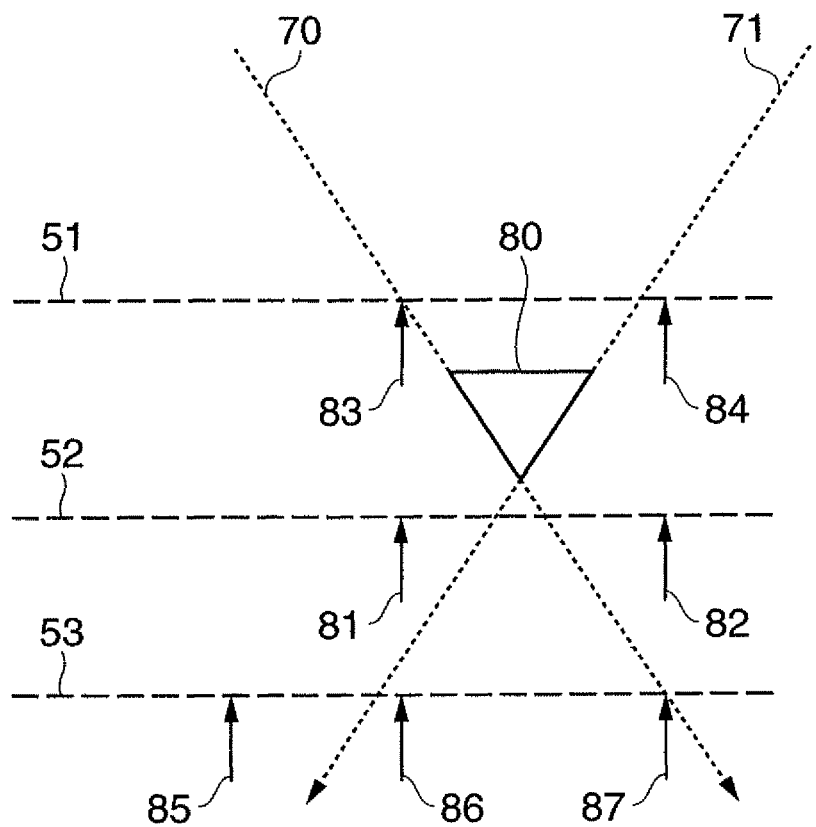

FIG. 8 is an explanation drawing of the image generation by the image generating unit 5, in case a pixel value can not be determined by pre-images on the closest layer. Firstly, the image generating unit 5 determines each pixel value of an image 80 by a pre-image 81 and/or a pre-image 82 on the closest layer 52 to the image 80 using a process described above. If all pixel values cannot be determined by the pre-image 81 and/or the pre-image 82 on the layer 52, the image generating unit 5 determines the undetermined pixel values using a pre-image 83 and/or a pre-image 84 on the second closest layer 51 using a process described above. If all pixel values cannot be determined by the pre-image 83 and/or the pre-image 84 on the layer 51, the image generating unit 5 determines the undetermined pixel values using pre-images 85, 86 and/or 87 on the third closest layer 53. If all pixel values cannot be determined using pre-images on all layers, the image generating unit 5 determines the undetermined pixel values by interpolation using already determined pixel values around the undetermined pixels on the same image 80.

In another embodiment, the image generating unit 5 determines an image from a specified viewpoint by averaging a plurality of images, each of which is generated by a pre-image. For example, the image generating unit 5 generates seven images from a viewpoint of the image 80 using pre-images 81 to 87, respectively. That is, the first image is generated from the pre-image 81 using a process described above, the second image is generated from the pre-image 82 using a process described above, and the seventh image is generated from the pre-image 87 using a process described above. Then, the image generating unit 5 calculates an average value for each pixel of seven images, and generates the image 80 having pixel values equal to average values. Here, undetermined pixel values from pre-images 81 to 87 due to occlusion are excluded from averaging process. It is noted, in FIG. 8, the fifth image generated from the pre-image 85 is used to determine pixel values caused by rays between the pre-images 85 and 86, and other pixel values in the fifth image are excluded from the averaging process. Similarly, the seventh image generated from the pre-image 87 is used to determine pixel values caused by rays between the pre-images 86 and 87, and other pixel values are excluded from the averaging process.

To realize a free viewpoint video system, cameras are arranged in the first area towards the second area, where one or more objects are placed, and each camera captures objects. Normally, the number of cameras to be used is limited. Thus, an image from a viewpoint, where no camera is placed, should be generated from captured images by using interpolation techniques. However, it is not realistic to generate images from all possible viewpoints in advance, due to a limitation of a capacity of the storage unit 1 and processing load. In other words, it is not realistic to generate data for all rays in a ray-space in advance. Therefore, a depth map is generated for each pre-image, and a pixel in an image from an arbitrary viewpoint is generated by determining corresponding pixels on pre-images using depth maps of the pre-images. A decision of a pixel value using the depth map is easy, and it is possible to reduce data stored in the storage unit 1.

However, if pre-images are prepared only in the first area, it takes a long time to generate an image from a viewpoint, which is occluded from the first area. For example, pre-images 21 have no corresponding pixel to a pixel caused by the ray 38 in FIG. 6. In this case, to generate the image 20, the image generating unit 5 needs to search pre-images having pixels representing the point 13. Since this operation takes a long time, the invention set several lines in the second area, and prepares pre-images and their depth maps on these lines in the second area. With this configuration, images from any viewpoint can be generated quickly, and data in the storage unit 1 can be reduced.

Figure 2A:
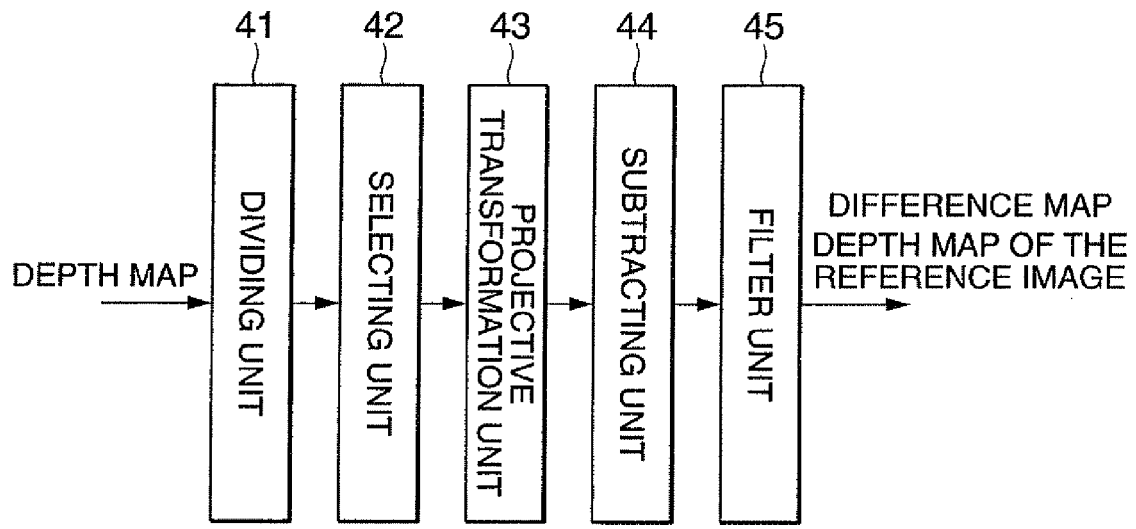
FIG. 2A shows a block diagram of a depth compressing unit.

Then, functions of the depth compressing unit 4 and the depth decompressing unit 6 are described below. FIG. 2A shows a block diagram of the depth compressing unit 4. The depth compressing unit 4 includes a dividing unit 41, a selecting unit 42, a projective transformation unit 43, a subtracting unit 44 and a filter unit 45.

Figure 9:
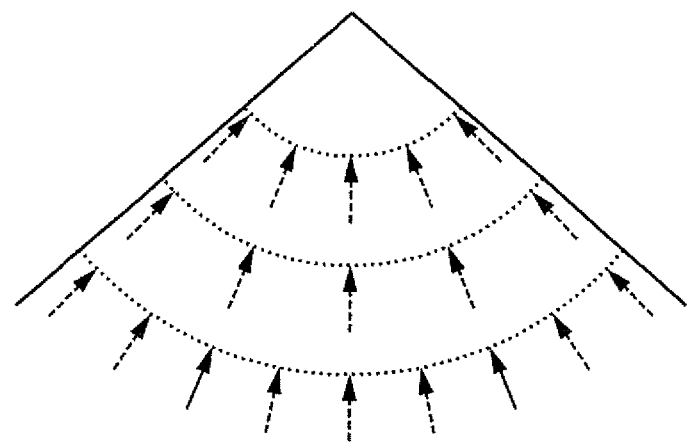
FIG. 9 shows a sub-area.

The dividing unit 41 divides an area including viewpoints of pre-images into a plurality of sub-areas. For example, FIG. 9 shows a sectorial sub-area, which is obtained by dividing the area shown in FIG. 3. Each process described below is performed on each sub-area independently. The selecting unit 42 selects one reference image from pre-images in each sub-area, respectively. For example, the selecting unit 42 selects, but not limited to, a pre-image on the outmost line in FIG. 9. The other pr-images in the sub-area are defined as target images. It is noted that the reason of dividing the area into a plurality of sub-areas is to prevent a distance between the reference image and each target image from increasing too much, and the person in the art can specify the size of sub-areas. It is noted that it is not required to divide the area to a plurality of sub-areas, in case the area is not so large.

Figure 11:
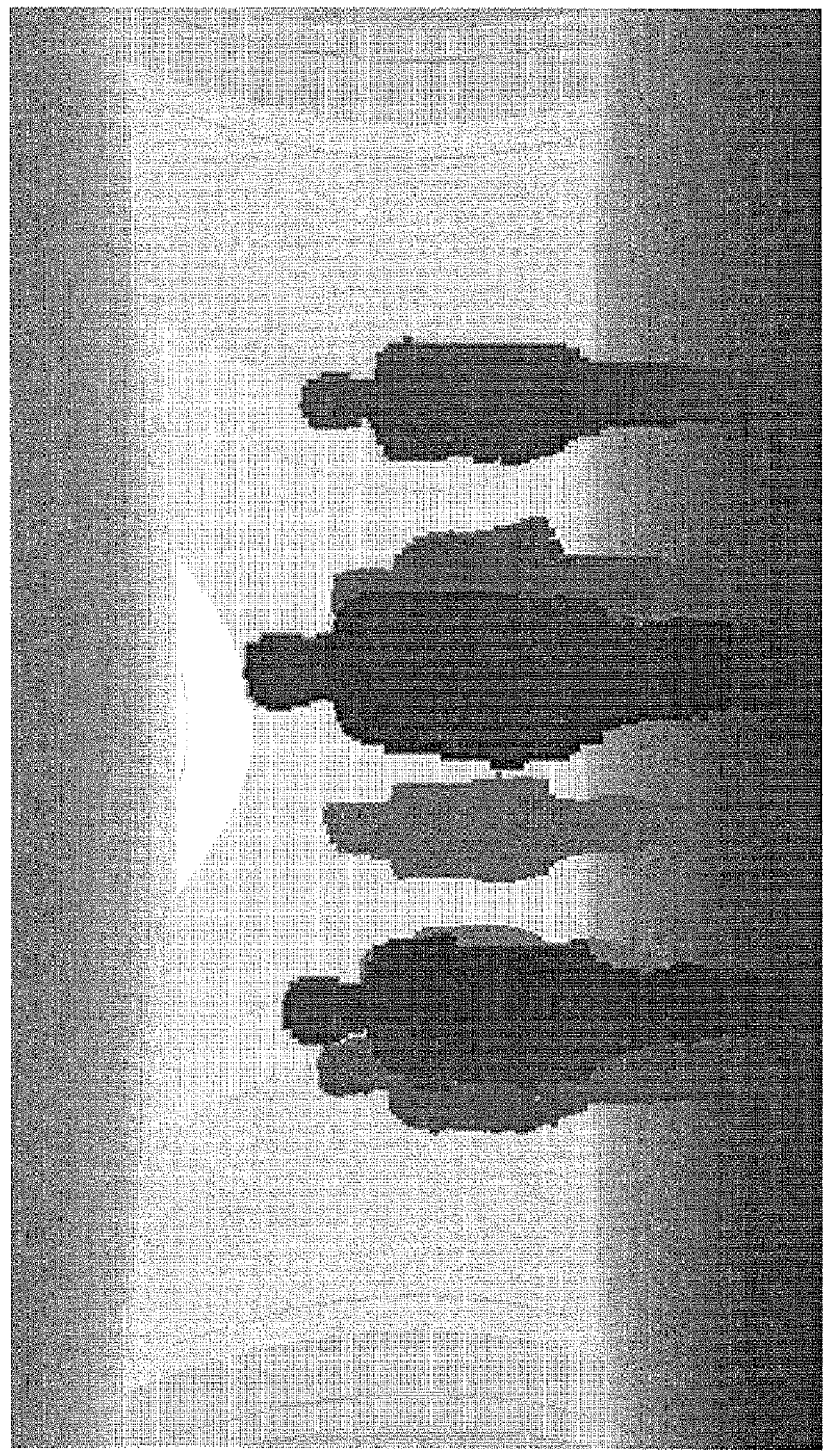
FIG. 11 shows a depth map of a reference image.
Figure 12:
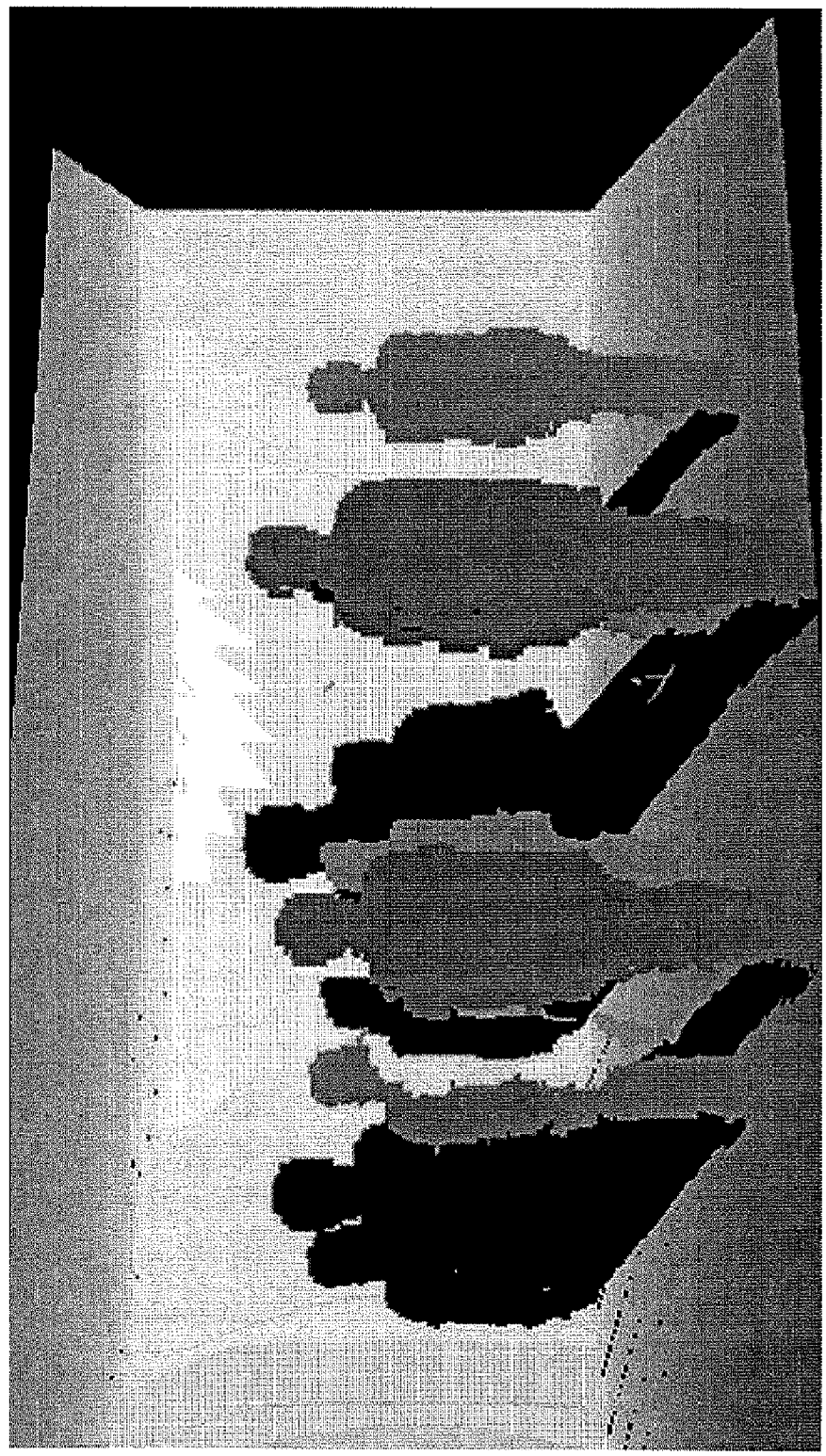
FIG. 12 shows a projected depth map of a target image created from a depth map of the reference image.
Figure 13:
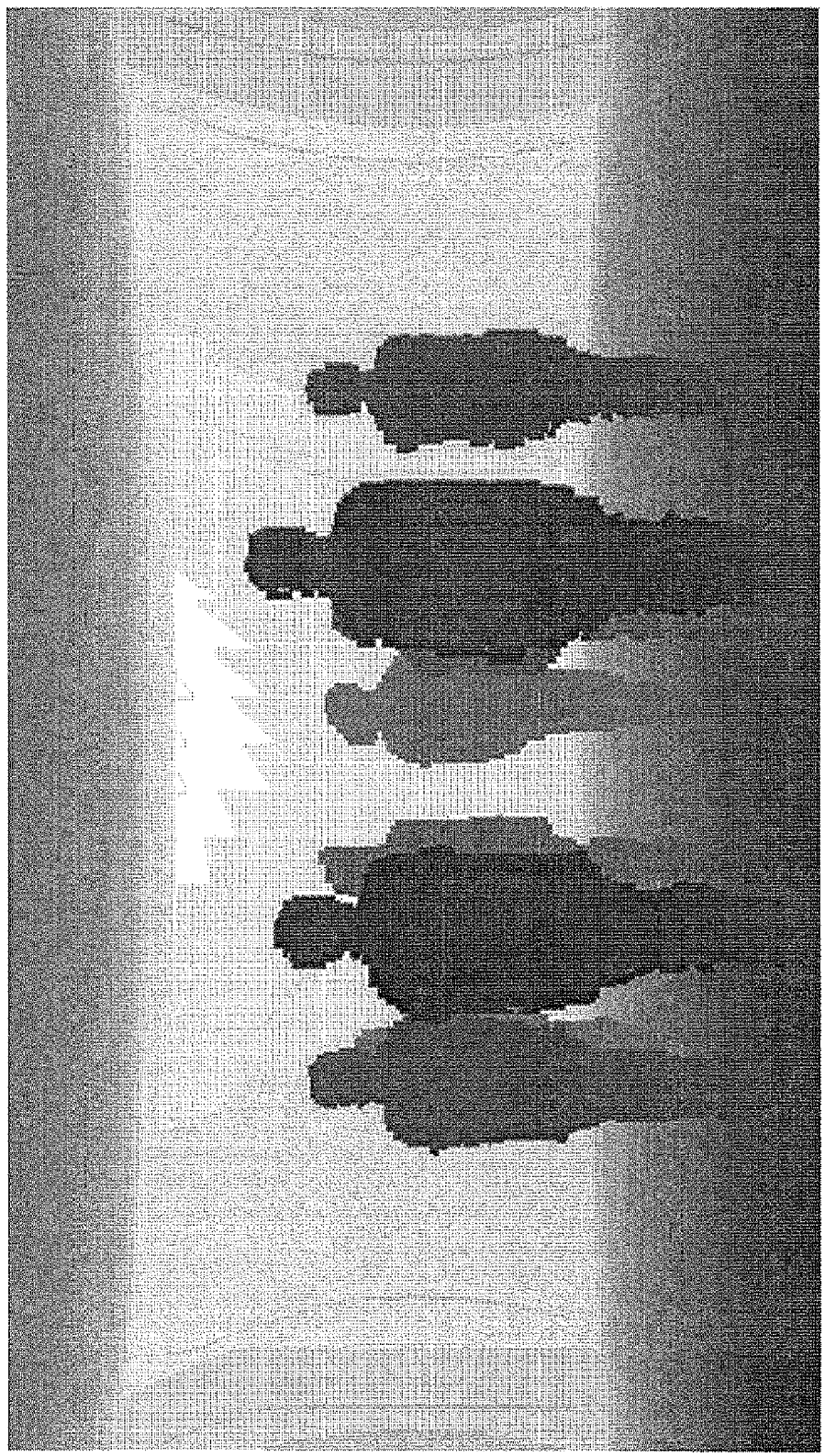
FIG. 13 shows a depth map of the target image generated by a depth generating unit.

The projective transformation unit 43 creates a projected depth map at each viewpoint of target images from a depth map of the reference image by projective transformation. That is, the projective transformation unit 43 creates a projected depth map of a target image based on a viewpoint, a visual field and the depth map of the reference image as well as a viewpoint and a visual field of the target image using a well-known art. FIG. 11 shows a depth map of the reference image, and FIG. 12 shows a projected depth map of one target image created from the depth map of the reference image shown in FIG. 11. In FIGS. 11 to 13, lower brightness value indicates shorter distance. Further, in FIG. 12 the lowest brightness, i.e. brightness value is 0 (pure black), indicates no depth value for the pixel, because the point represented by the pixel is occluded from the viewpoint of the reference image.

FIG. 13 shows a depth map of the same target image as shown in FIG. 12 generated by the depth generating unit 3. The subtracting unit 44 outputs a difference map by subtracting the depth map of the target image generated by the depth generating unit 3 from the projected depth map of the same target image. That is, the subtracting unit 44 calculates the difference between the depth map in FIG. 13 and the projected depth map in FIG. 12 for each pixel. Since noises and/or cracks are introduced by projective transformation, the filter unit 45 filters out noises and cracks from each difference map, and then the depth map of the reference image and difference maps of target images are stored in the storage unit 1. With this configuration, an amount of data to be stored in the storage unit 1 can be reduced.

Figure 2B:
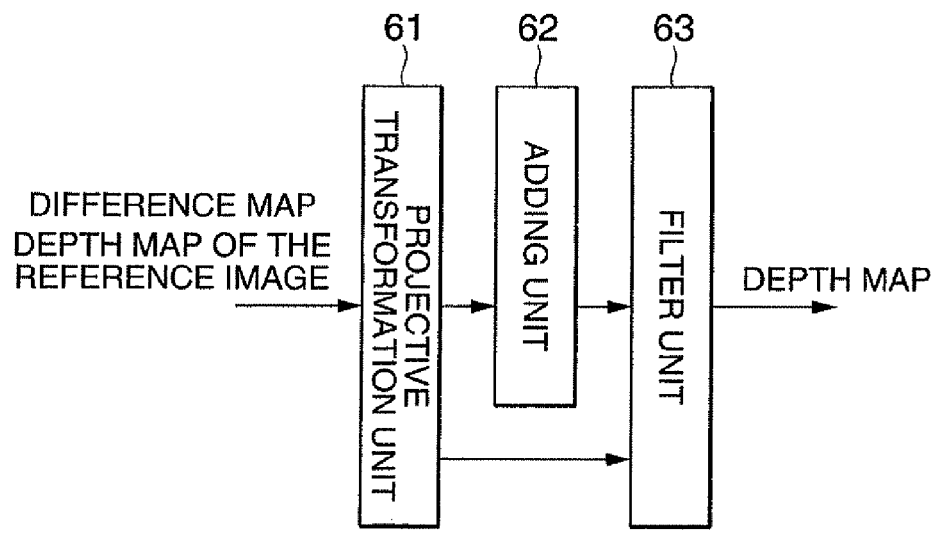
FIG. 2B shows a block diagram of a depth decompressing unit.

FIG. 2B shows a block diagram of the depth decompressing unit 6. The depth decompressing unit 6 has a projective transformation unit 61, an adding unit 62, and a filter unit 63. The projective transformation unit 61 creates a projected depth map at each viewpoint of target images from the depth map of the reference image by projective transformation. The adding unit 61 outputs a decompressed depth map for each target image by adding the difference map and the projected depth map of each target image. The filter unit 63 determines edge areas in the difference map, and filters areas of the decompressed depth map corresponding to the determined edge areas to smooth a depth value distribution of the decompressed depth map. With this configuration, the effect caused by data compression of depth maps can be reduced.

Figure 10:
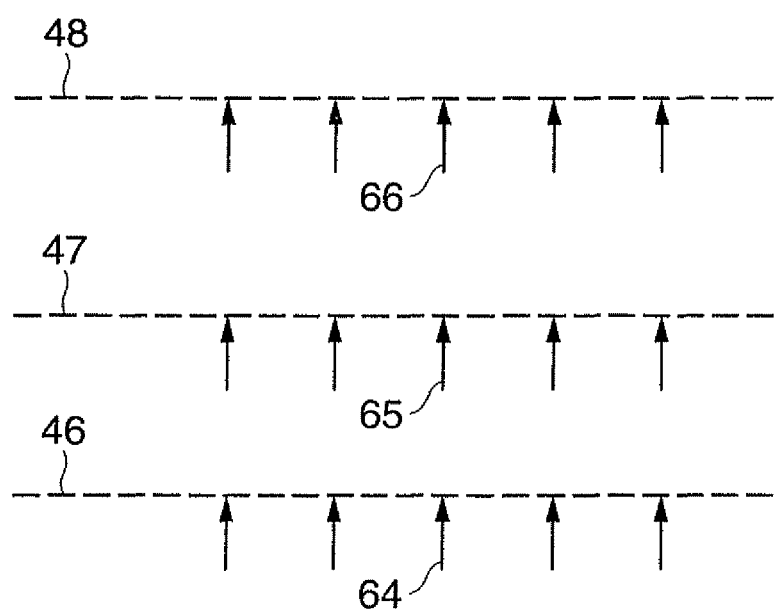
FIG. 10 is an explanation drawing of another embodiment of the invention.

In the above embodiment, all projected depth maps of target images in the sub-area are generated from the depth map of the reference image directly. But the invention is not limited to the embodiment. FIG. 10 is an explanation drawing of another embodiment of the invention. In this embodiment, the projective transformation unit 43 generates projected depth maps at viewpoints of target images 65 and 66 from the depth map of a reference image 64, generates projected depth maps at the other viewpoints on a layer 47 from the projected depth map of the target image 65, and generates projected depth maps at the other viewpoints on a layer 48 from the projected depth map of the target image 66. Further, in another embodiment, the projective transformation unit 43 generates a projected depth map of the target image 65 from the depth map of the reference image 64, generates a projected depth map of the target image 66 from the projected depth map of the target image 65, and generates projected depth maps of the other target images on the layer 47 and 48 from the projected depth map of the target image 47 or 48 on the same layer.

Further, it is possible to compress pre-images using the same process for depth maps. More specifically, the projective transformation unit 43 generates a projected image at each viewpoint of target images from the reference image, and the subtracting unit 44 generates image data to be stored by calculating a difference for each pixel between the target image and the projected image for each target image. Decompressing can be performed using the same process for depth maps.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program, which realizes the functions of the above embodiments on a computer system. Programs defining functions on the invention can be delivered to a computer system using computer readable storage media or via network. It should be understood the invention may be implemented by software, hardware or a combination of software and hardware.

The invention claimed is:

1. An image processing apparatus, comprising:
    a dividing unit that divides an area including viewpoints of images into a plurality of sub-areas;
    a selecting unit that selects one image as a first image from a plurality of images in each sub-area, respectively, and configured to define other images of the plurality of images as second images in each sub-area, respectively;
    a depth generating unit that generates a depth map of the first image and a depth map of the second image, the depth maps indicating a depth value of a pixel of a corresponding image;
    a projective transformation unit that generates a projected depth map of the second image of the second images from the depth map of the first image;
    a subtracting unit that creates a difference map of the second image, the difference map being a difference between the depth map of the second image and the projected depth map of the second image; and
    a storage unit that stores the depth map of the first image and the difference map of the second image,
    wherein each of the depth generating unit, projective transformation unit, subtracting unit, and storage unit operates independently on the first and second images of each of the sub-areas in the plurality of sub-areas.

2. The image processing apparatus according to claim 1, further comprising:
    a first filter unit that filters the difference map of the second image.

3. The image processing apparatus according to claim 1, further comprising:
    an adding unit that generates a decompressed depth map of the second image by adding the projected depth map of the second image and the difference map of the second image.

4. A non-transitory computer readable medium storing a computer program to cause a computer to operate as the apparatus according to claim 1.

* * * * *